Nov. 8, 1966   J. SACK   3,284,102

BOOKBINDING

Filed Nov. 13, 1964

INVENTOR
JOSEPH SACK
By Irwin S. Thompson
ATTY

3,284,102
BOOKBINDING
Joseph Sack, Johannesburg, Republic of South Africa, assignor to Print & Plastics (Proprietary) Limited, Johannesburg, Republic of South Africa
Filed Nov. 13, 1964, Ser. No. 410,948
Claims priority, application Republic of South Africa, Nov. 21, 1963, 63/5,296
2 Claims. (Cl. 281—21)

As a wrapping or cover the advantages of plastic sheet material, such as polythene sheet, over paper are manifold. Plastic is stronger, more resistant to tearing, waterproof, washable and non-inflammable, so that where these characteristics are important there is no doubt as to which material will be selected, the cost factor being equal or nearly so. However, when the sheeting is to be secured to a surface to act as a label or a covering, the choice is less obvious because of the comparative ease with which paper can be bonded to almost anything and the comparative difficulty or expense of bonding plastic.

The object of the invention is to provide a plastic sheet which can be as readily bonded to any surface as paper can be.

According to the invention, one face of a plastic sheet is treated by forming a fibrous layer thereon which is capable of easy gluing. The layer may be a lamina of paper or it may be a fibrous deposit formed by spraying or painting, or it may be a textile or fabric layer.

The invention relates also to the application of the method set out above to book binding.

The invention is shown in the accompanying drawings in which

Figure 1:
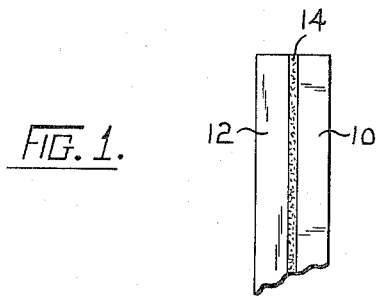
FIGURE 1 is an edge view, greatly enlarged of a laminated plastic sheet and an adherent fibrous layer.

In FIGURE 1, a plastic sheet 10, such as polythene has applied to it a layer 12 of fibrous material which, as remarked above, may be a lamina of paper or may be a fibrous deposit formed by spraying or painting.

Where the layer 12 is paper, the procedure consists in securing the sheet of paper to the plastic sheet by means of a suitable adhesive and preferably by a layer of a contact glue 14. To ensure permanent adhesion over the full area, the superimposed laminae may and should be rolled together to expel entrapped air.

When the layer 12 is a fibrous deposit, the discrete fibrous matter is mixed with a suitable binder, applied to the plastic sheet and then caused or allowed to set.

It is not always necessary that the two layers be superficially coincident. In the case of a book, for instance, where the sheet 10 will form the cover, only the zone of the sheet that overlies the spine of the book need be treated, unless the inside faces of the cover are to be lined. For a label for a bottle, only the end zones need be treated.

If, however, the sheet is to be sold for general purposes, such for instance, as a lining material, then the fibrous layer will cover the whole plastic sheet.

The laminated sheet 10, 12, is readily folded or bent if the plastic layer 10 be thermoplastic and be first heated. Thus the laminated sheet of the invention may be deformed to any required contour without weakening the sheet.

This characteristic leads to one important aspect of the invention, and that is its use in bookbinding for what are known as "paper-back" books.

In current practice, the covers of these books are made from thick paper (or thin flexible cardboard) which are sulcated and folded to conform with the configuration of the book, and then secured to the book.

Paper or thin cardboard has little resistance to tearing and the sulcations formed in the cover constitute lines of weakness. It is common experience that paper-backed books tear there.

Of course, books bound in more robust material, such as buckram or canvas, are less apt to disintegrate in this way, but then they are considerably more expensive than paper-backed books.

Use of the sheet of the invention provides a binding procedure which is little if anything more expensive than paper-back binding and which at the same time produces books which are very much stronger than conventional paper-backed books.

Figure 2:
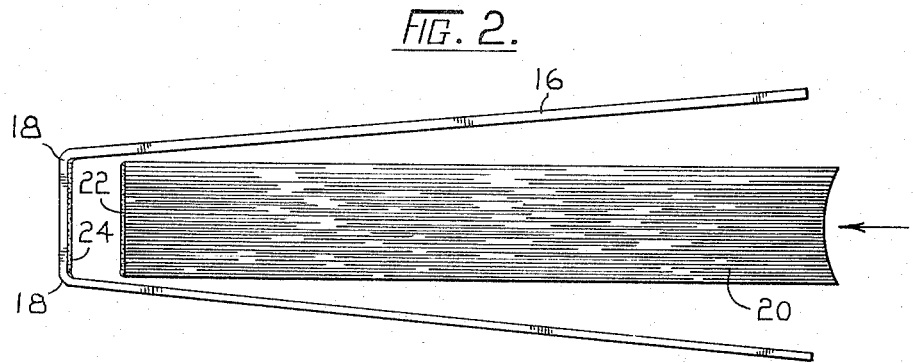
FIGURE 2 is a side view showing the binding of a square-spined book.
Figure 3:
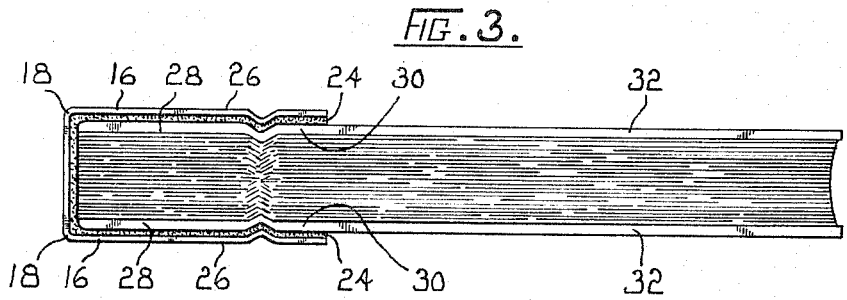
FIGURE 3 is a side view showing the binding of a quarter-bound book.
Figure 4:
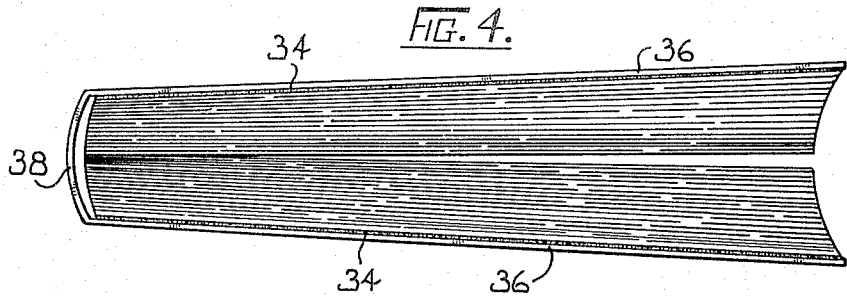
FIGURE 4 is a side view showing the binding of a hollow-back book.

This procedure is illustrated in FIGURES 2, 3 and 4.

In FIGURE 2, the sheet 16 is heated along parallel lines 18 and is bent while hot to form a trough-shaped cover. Alternatively the sheet is scored cold along parallel lines to produce fold lines. The bound square-spined book 20 is then glued over its spine 22 (and, if a contact glue is used, so is the fibrous layer 24 on the cover).

The spine 22 and layer 24 are then brought into contact to secure the book within the cover. As the spine and the layer 24 are fibrous a good union is easily obtained, and as the fold lines 18 do not weaken the cover the binding is strong and durable.

The layer 24 is shown as extending coincidentally with the spine 22, but if the cover is to be lined or is to be united to the first and last pages of the book 20 then the layer is made to extend across the full area of the sheet 16.

In a quarter-bound book, the sheet 16 (FIGURE 3) is heated or scored, and folded, as in FIGURE 2, and the layer 24 covers the whole area of the sheet. The wings 26 however extend only far enough to cover the stubs 28 of the cover and the marginal areas 30 of the boards 32.

In a hollow-back book (FIGURE 4), layers 34 are applied to the insides of the wings 36 but not to the back 38 of the cover. The book is bound in the conventional way and end papers are glued to the insides of the wings.

In the binding process, whatever the type of book, the book may itself be used as the former. In this case the heated sheet is juxtaposed to the book and folded over to form the covers.

More usually, however, the cover will first be formed and then applied to the book.

For square-spined and quarter-bound books, two lines of heating are employed spaced apart the width of the spine, and the cover is folded at right angles at both lines to form the trough.

The main advantage of the process is that it eliminates the tearing tendency of paper covers because of their low fold endurance. The weakest point in a paper-back cover is the junction of the spine and the cover, that is where the lines 18 occur. This is particularly marked with the new system of "lumback" binding which bonds all the pages of the book together with powerful adhesive so that the book may be opened at any page without difficulty. Because the glue on the spine is so strong and the paper or board of the cover so weak relatively to the bonding of the spine to the book, there is an inevitable weakness where the two opposite elements come together. With the plastic cover laminated to paper and then bonded to the book spine, there is no such weakness. The cover at the point where the fold begins and the spine ends has both enormous tensile strength and sufficient elasticity. Consequently, no damage can be done either to the spine or to the cover itself, and fold endurance is enormous.

The heating of the plastic sheeting is conveniently carried out by means of heating bars of which the elements are either resistance- or induction-heated.

The plastic sheet may be printed, engraved or embossed before the binding process begins or simultaneously with the heat treatment; and, where paper is used as an inner layer over the whole cover, it may be printed to provide end papers which may be the first and last pages of print.

The advantages of plastic covers for books, over paper or cardboard need hardly be stressed. Apart from resistance to tearing, plastic is washable, waterproof, not easily stained or marked and non-inflammable. The preferred plastic is polythene of thickness, density and stiffness to suit individual requirements. This material, used as described, is cheap enough to be competitive with paper covers.

I claim:
1. A process of bookbinding which consists in applying to at least a portion of one face of a flexible plastic sheet a strongly adherent layer of discrete fibrous material homogeneously mixed with glue, bending the sheet to trough shape with said layer covering the bottom of the trough, applying a layer of adhesive to the spine of a book, and applying the glued spine to the layer of discrete fibrous material.

2. A book having a cover which is flexible plastic sheet one face of which has thereon a strongly adherent layer of discrete fibrous material homogeneously mixed with glue, at the spine, and a bound book glued at its spine to said layer.

References Cited by the Examiner
UNITED STATES PATENTS

| | | | |
|---|---|---|---|
| 2,966,439 | 12/1960 | Sorel | 161—250 X |
| 2,991,217 | 7/1961 | Schmidt et al. | 161—250 X |
| 3,088,753 | 5/1963 | Sendor | 281—29 |
| 3,131,113 | 4/1964 | Arbit et al. | 161—250 X |
| 3,161,560 | 12/1964 | Paquin et al. | 161—250 |

LAWRENCE CHARLES, *Primary Examiner.*